Figure 1:
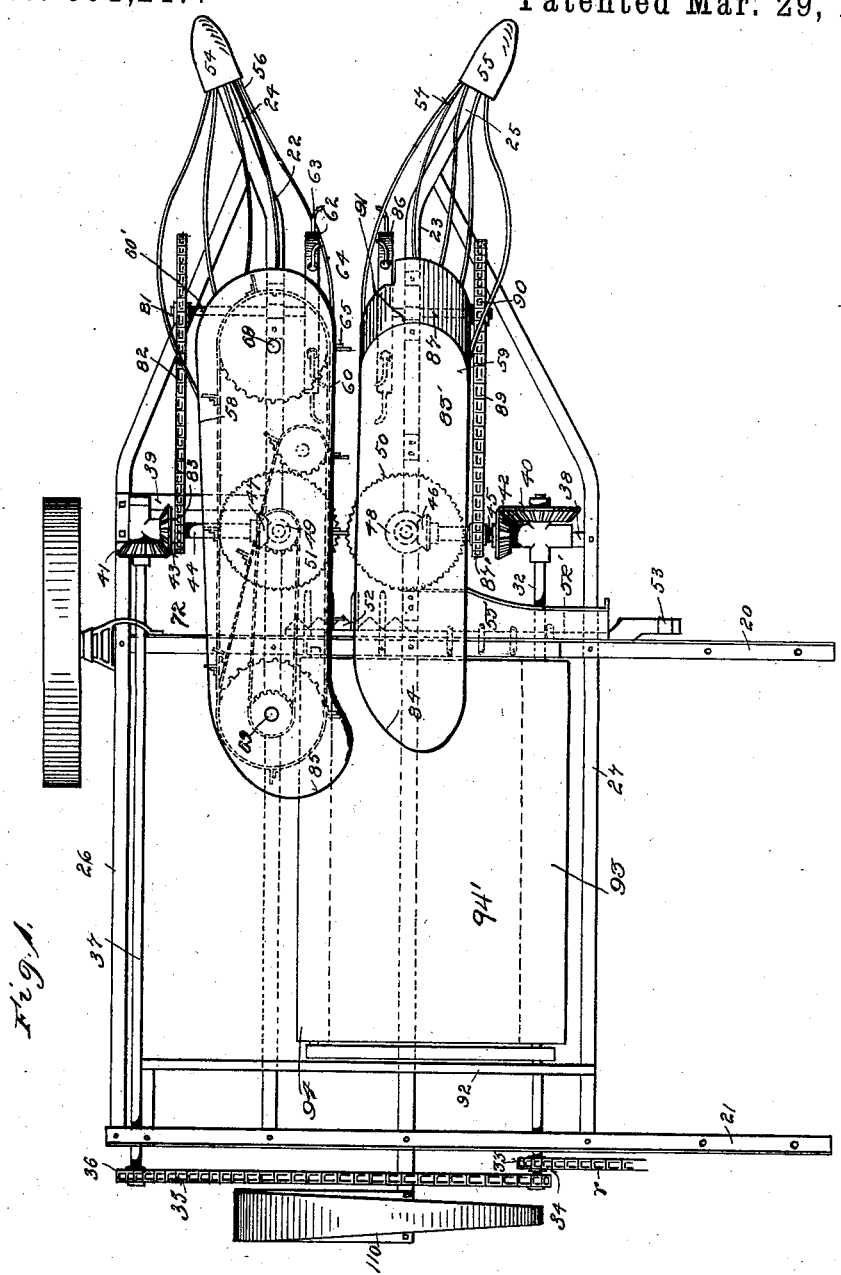

(No Model.)

W. A. GALLOWAY.
COMBINED HARVESTING MACHINE.

No. 601,247. Patented Mar. 29, 1898.

6 Sheets—Sheet 1.

WITNESSES:

INVENTOR
William A. Galloway
BY
Chandler & Chandler
ATTORNEYS.

(No Model.)  6 Sheets—Sheet 2.
W. A. GALLOWAY.
COMBINED HARVESTING MACHINE.
No. 601,247. Patented Mar. 29, 1898.
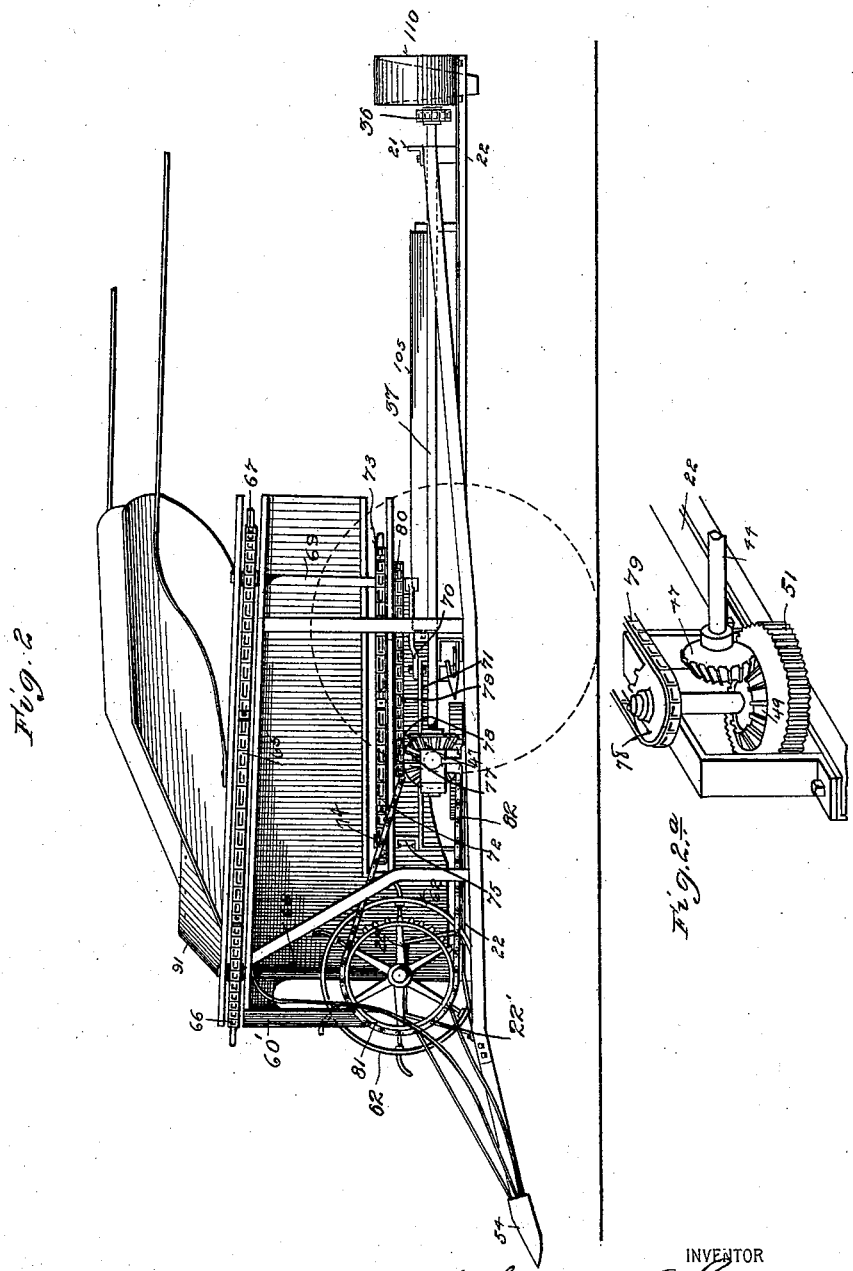
WITNESSES:
INVENTOR
William A. Galloway
BY
Chandlee & Chandlee
ATTORNEYS (No Model.)  6 Sheets—Sheet 3.
W. A. GALLOWAY.
COMBINED HARVESTING MACHINE.
No. 601,247. Patented Mar. 29, 1898.
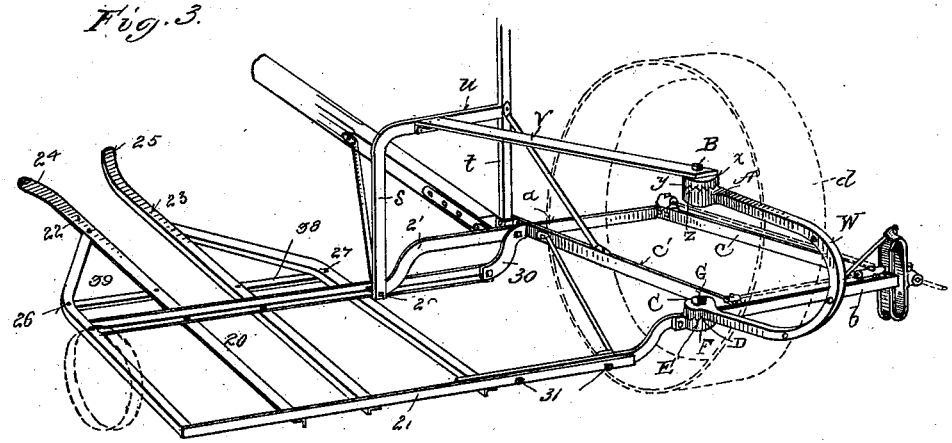
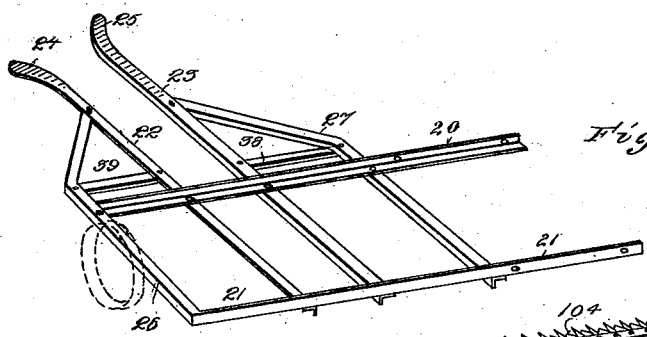
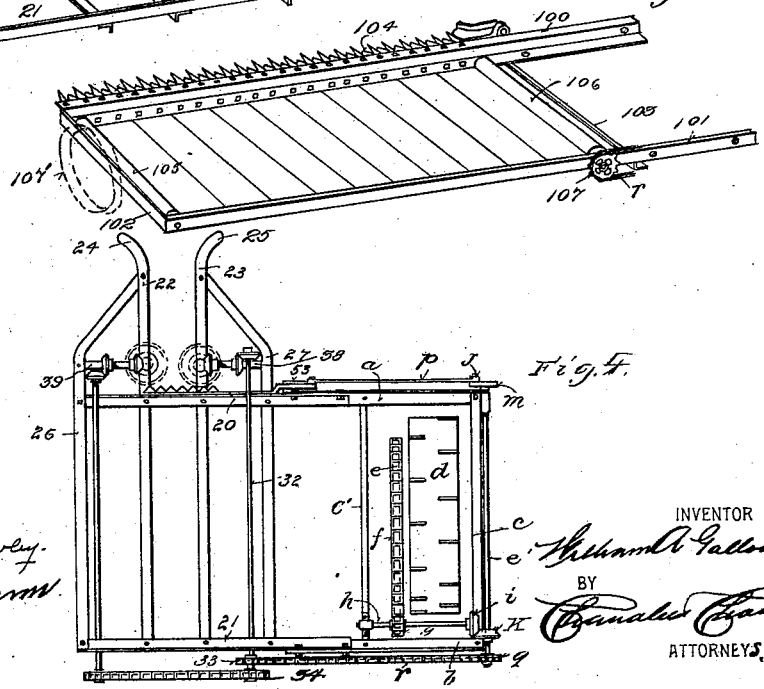

(No Model.) 6 Sheets—Sheet 4.
W. A. GALLOWAY.
COMBINED HARVESTING MACHINE.
No. 601,247. Patented Mar. 29, 1898.
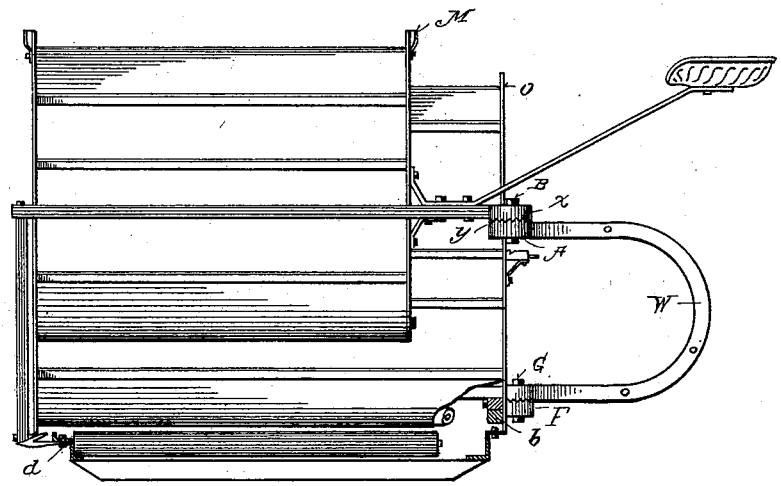
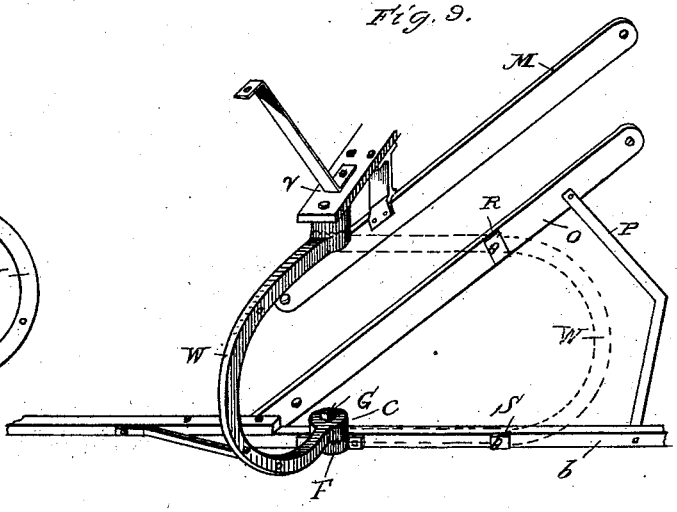
WITNESSES:
INVENTOR
William A. Galloway
BY
Chandler & Chandler
ATTORNEYS.

(No Model.) 6 Sheets—Sheet 5.

W. A. GALLOWAY.
COMBINED HARVESTING MACHINE.

No. 601,247. Patented Mar. 29, 1898.

WITNESSES:

INVENTOR
William A. Galloway
BY
Chandler & Chandler
ATTORNEYS

THE NORRIS PETERS CO., PHOTO-LITHO., WASHINGTON, D. C.

(No Model.) 6 Sheets—Sheet 6.
W. A. GALLOWAY.
COMBINED HARVESTING MACHINE.
No. 601,247. Patented Mar. 29, 1898.

WITNESSES: INVENTOR
William A. Galloway
BY
ATTORNEYS.

UNITED STATES PATENT OFFICE.

WILLIAM A. GALLOWAY, OF XENIA, OHIO.

COMBINED HARVESTING-MACHINE.

SPECIFICATION forming part of Letters Patent No. 601,247, dated March 29, 1898.

Application filed March 8, 1897. Serial No. 626,550. (No model.)

*To all whom it may concern:*

Be it known that I, WILLIAM A. GALLOWAY, a citizen of the United States, residing at Xenia, in the county of Greene, State of Ohio, have invented certain new and useful Improvements in Combination Harvesting-Machines; and I do hereby declare the following to be a full, clear, and exact description of the invention, such as will enable others skilled in the art to which it appertains to make and use the same.

My invention relates to havesting-machines; and it has for its object the production of interchangeable wheat and corn harvesting attachments in combination or connection with small grain-binder mechanism.

As harvesters and binders have heretofore been constructed no provisions have been made for combining with a main frame a supplemental frame adapted for the cutting of corn and having mechanism for delivering the cut corn to the mechanism of the main frame and a second supplemental frame having mechanism for cutting wheat and delivering it to the main frame. My invention comprehends, broadly, the provision of such a combined and interchangeable machine.

A further object of my invention is to provide, in connection with an open-ended binder-frame, a novel form of support for the seat-board and elevator-frames ordinarily carried thereby, whereby such support may be readily adjusted to secure the best results under all conditions and may be rigidly held as adjusted.

In my invention I preferably employ any general form of open-ended main frame of a harvester bearing the usual elevating, binding, and bundle-carrier mechanism, with the exception that the rear seat-board support is pivotally connected with the latter and with the rear sill of the main frame and is adapted to be clamped at any point of its pivotal movement.

The supplemental frame preferably employed by me comprises front and rear sills, also outside and inside sills and intermediate throat-pieces, and is adapted to be attached to the main frame of a wheat-harvester in the position occupied by the usual platform of the said harvester, one expression of which engagement is shown in the drawings, the reel and coöperating parts being removed.

Figure 10:
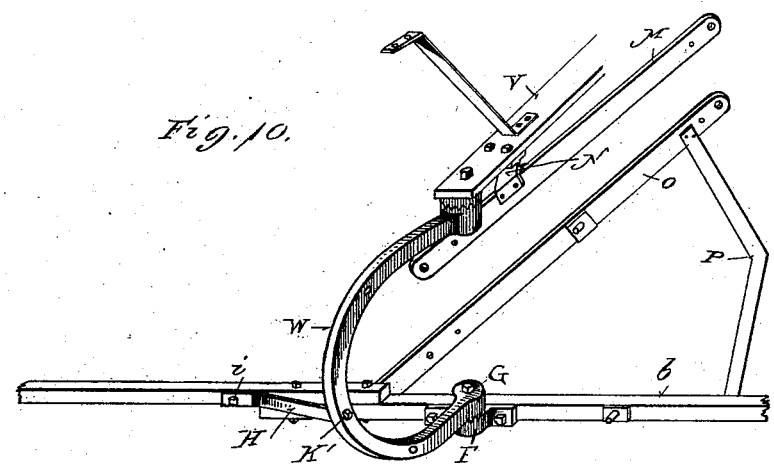
Figure 11:
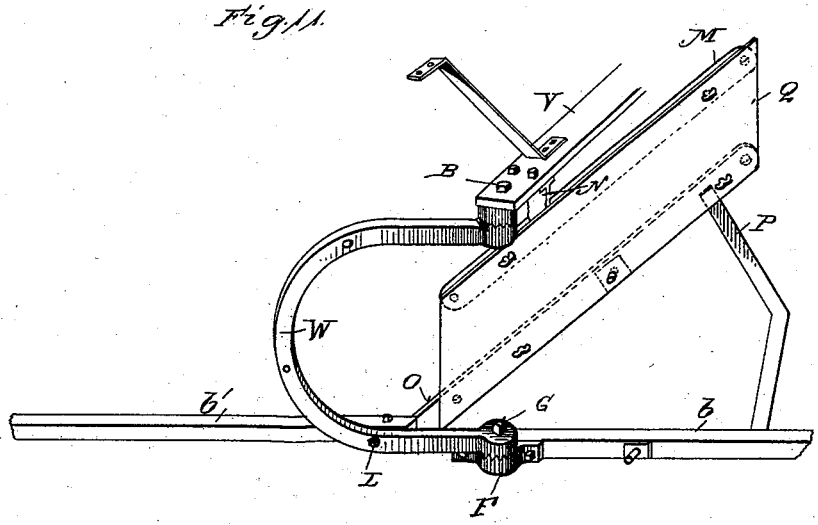
Figure 12:
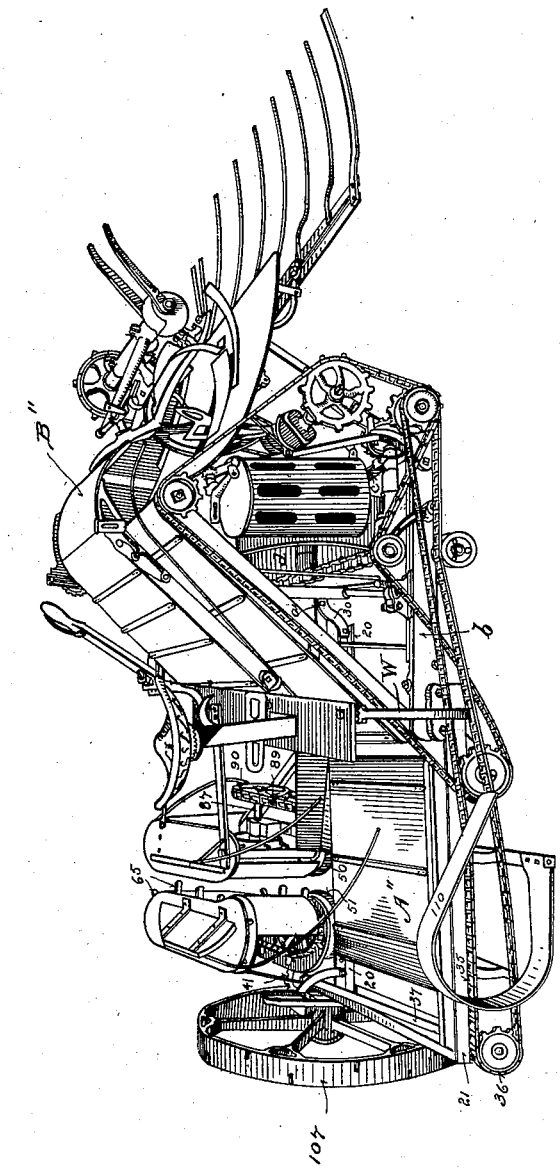

Referring now to the drawings forming a portion of this application and in which like letters and figures of reference indicate similar parts in the several views, Figure 1 is a plan view of my detachable cutter-platform for harvesting corn, showing the location and arrangement of the cutting mechanism, as also a means of attachment to and the transmission of motion from the main frame. Fig. 2 is a side view of my supplemental platform, looking to the right. Fig. 2ª is a detail perspective view of one form of mechanism driving crushing-rolls 50 and dog-chains 72 and 65. Fig. 3 is a perspective view of the skeleton of the main frame and supplemental platform combined, the supplemental platform shown being that of a corn-harvester. Fig. 4 is a plan view of Fig. 3, showing the cutting mechanism of the corn-harvester, as also a means for transmitting motion from the traction-wheel of the main frame thereto. Fig. 5 is a perspective view of the skeleton or frame of the supplemental corn-harvester platform. Fig. 6 is a rear perspective of the wheat-harvesting attachment. Fig. 7 is a stubble side view of the main frame of a harvester, showing the relative arrangement of the elevators, the seat-board, and the adjustable seat-board support. Fig. 8 is a detail view of the rear seat-board support, showing its connection with the seat-board and means for holding the support in the desired position. Fig. 9 is a detail elevation showing the correlative arrangement of the main-frame skeleton, the elevator-frames, the seat-board, and the seat-board support, as also their mutual connections, the position of the seat-board support when clamped upon the lower elevator-frame or rear sill of the main frame being indicated in dotted lines. Fig. 10 is a view similar to Fig. 9, showing the rear seat-board support in position as when the machine is employed upon corn. Fig. 11 is a view similar to Figs. 9 and 10, showing one position of the rear seat-board support when in position for operation in connection with a wheat-cutting platform, the elevator being closed by means of a board secured to the elevator-frames supporting them. Fig. 12 is a perspective view of grain-binder and corn-harvester elements with their adjuncts combined to form a concrete machine.

Referring now to the drawings, and more particularly to Figs. 3, 4, 7, 8, 9, 10, and 11, I employ in connection with my invention the usual main-frame skeleton, comprising front and rear sills $a$ and $b$, side sill $c$, and middle sill $c'$, in which frame is journaled a traction-wheel $d$, provided with a sprocket $e$, adapted to receive a chain $f$, communicating with a second sprocket $g$, carried by a shaft $h$, suitably journaled upon the frame, said shaft being provided with a miter-gear $i$, meshing with a similar gear $k$, carried by a shaft $e'$, which latter is arranged along the sill $c$ and is provided at its end with a crank-disk $m$, extending from the crank-pin $o$ of which is a pitman $p$ for a purpose as will be presently explained.

Secured to the front sill $a$ of the main frame are usual uprights $s$ and $t$, having cross-piece $u$, to which latter is secured the seat-board $v$, said seat-board being of any desired form and material and extending rearwardly of the frame and having a rear U-shaped support W.

The support W is adapted for pivotal adjustment and is connected at one end with the seat-board $v$ through the medium of a block $x$, having radial serrations $y$, adapted to receive corresponding ribs $z$ of the enlarged end A of the support. The block $x$ and end A are preferably cylindrical in form, though, as will be readily understood, they may have any desired shape.

Formed vertically through the end A, the block $x$, and adjacent end of a seat-board $v$ is a perforation adapted to receive a pivotal clamping-bolt B, which when operated draws the ribs of the adjacent end of the support $w$ into the serrations or grooves of the block $x$, and thus holds these elements fixedly together.

The lower end of the support W is also provided with an enlarged cylindrical end C, which end is likewise provided with radial ribs and serrations D and E, corresponding with which end is a block F, arranged upon the rear sill of the main frame, which block is adapted to engage the under surface of the end C and is provided with radial ribs and serrations adapted to mesh with those of the said end.

A clamping pivot-bolt G is passed vertically through the end C and block F, and when operated holds these elements securely together, the support when thus clamped having sufficient strength for all requirements.

Referring now more particularly to Figs. 8, 9, 10, and 11, in Fig. 10 I have shown means for further holding the brace in position, which means consist of a brace H, bolted to a suitable portion of the machine at $i$ and likewise bolted to the support W at $k'$.

In Fig. 11 the support W is shown in a position lying parallel with the sill $b'$ of the attached frame, which support is held in this position through the medium of a bolt L, passed through said support and an adjacent portion of the machine. It will be readily understood that in swinging the support W from one position to another the bolts B and G are first loosened, and after the support has been swung as desired these bolts are tightened and a clamping action results.

The rear elements of the elevator-frame are supported in the usual manner, the upper frame element M being hung from the seat-board $v$ through the medium of a hanger N, the lower element O in one form of my invention being arranged parallel with the element M and secured at its lower end to the rear sill $b$, the upper end being held in place through the medium of a suitable support P, secured thereto and extending also to the rear sill $b$.

In Fig. 11 of the drawings I have shown the adjusted position of the seat-board support W when the main frame is used in connection with a wheat-cutting supplemental frame or is being moved to or from a field or through gates, at which time in order to further strengthen the structure and relieve the support from unnecessary strain I may connect the upper and lower elements M and O of the elevator-frame by means of a support Q, the effect of which is to close the end of the elevator and hold the frame elements fixedly in their proper positions. When the board Q is not used, the same result in a measure may be secured by swinging the support W into the position shown in the dotted lines in Fig. 9—i. e., to impinge the lower elevator-frame element O—against which it is held through the medium of a clamp R, a second clamp S being also adjusted to hold the support against the rear sill $b$, though, as readily understood, similar results may be secured through the medium of a bolt passed through alining perforations in the elevator-frame element O and the support W, as also the latter and the sill $b$, in the same manner as described in connection with Fig. 11.

Referring now more particularly to Figs. 1, 2, 3, 4, 5, and 6, in forming my supplemental corn-cutting frame I employ a front or cutter-bar sill 20 and a rear sill 21, which sills correspond in arrangement and alinement with the front and rear sills $a$ and $b$ of the main frame, respectively. Secured transversely of the sills 20 and 21 are throat-pieces 22 and 23, having outwardly-turned front ends 24 and 25, which said pieces are firmly bolted to the sills mentioned and are further braced through the medium of outside and inside sills 26 and 27, which latter are arranged transversely of the sills 20 and 21, extending in front of the frame and bent inwardly to meet the throat-pieces 22 and 23 at points preferably in the rear of their ends.

The sills 20 and 21 project a considerable distance beyond the sill 27, the projecting end of the sill 20 being removably attached at one point to the downturned end 2' of the sill $a$ of the main frame through the medium of a bolt 29 or in any other desired manner, the extremity of the sill 20 being bolted or otherwise attached to a downwardly-extending bracket 30, depending from the sill a.

The end of the sill 21 is adapted to lie against the sill b of the main frame and is secured thereto through the medium of bolts 31, passed through alining perforations in the said sills. Thus, as will be readily understood, they may be fastened in any desired manner. These sills are made, preferably, of L-iron in order that one element may receive its corresponding element and hold it more securely.

Referring now more particularly to Figs. 1, 2, 3, and 4, I arrange transversely of the throat-piece 23 and side sill 27 a brace 38, upon which brace and the rear sill 21 is journaled a shaft 32, which latter extends beyond the sill and brace and is provided adjacent its rear end with a sprocket 33, which receives the chain r, a second sprocket 34 being arranged at its rear extremity, with which sprocket engages a chain 35, leading to a sprocket 36 upon the rear end of the shaft 37, journaled upon the sill 21 and upon a brace 39, arranged transversely of the outside sill 26 and throat-piece 22. The forward ends of the shafts 32 and 37 are provided with miter-gears 40 and 41, respectively, which said gears mesh with similar gears 42 and 43, respectively, the latter being arranged upon shafts 44 and 45, having at their opposite extremities also miter-gears 46 and 47, meshing with similar gears 48 and 49, carried by wheels or rolls 50 and 51, respectively, which latter are journaled in a common horizontal plane upon their respective throat-pieces 23 and 22, the peripheries of said wheels or rolls being corrugated transversely, the arrangement of the rolls being such as will allow a space therebetween of an extent considerably less than the diameter of a cornstalk, for a purpose as will be presently described, and which is clearly set forth in a separate application filed September 10, 1895, Serial No. 562,080, by Galloway and Smith.

It will be readily seen upon reference to the drawings that the transmitting mechanism from the main drive-shaft to the crushing-rolls differs, so that one of said rolls has a different speed from the other, the effect being that a grinding as well as a squeezing action is had upon the cornstalk, resulting in the chewing and more efficient reduction of the stalk previous to its engagement by the cutting mechanism. Moreover, the speed of the periphery of each crushing-roll is greater than the forward speed of the entire machine—that is, than the ground motion of the machine—the result being that the rolls not only crush the stalks, but that they actually feed them in the direction of the cutting mechanism.

In the rear of the rolls 51 and 50 and upon the front sill or cutter guide-bar 20 is arranged a common form of reciprocatory knives 52, which knives are provided with a lateral extension 52′, passing beneath a portion 53′ of the platform-floor, said extension having a heel 53 for attachment of the pitman p, as shown in Fig. 4 of the drawings. It will be readily understood, however, that any species of cutting mechanism may be substituted for these knives as may be deemed expedient at any time.

In order to deliver the corn, whether it be standing or down, first to the crushing-rolls 51 and 50 and subsequently to the cutting mechanism, I arrange upon the front ends 24 and 25 of the throat-pieces snouts comprising caps 54 and 55, curved rearwardly and upwardly, from which are a series of rods or bars 56 and 57, which bars are attached at their upper ends to the frames 58 and 59, arranged upon the throat-pieces 22 and 23, respectively.

The frame 58 extends rearwardly beyond the sill 20, its rear end being turned in the direction of the main frame, to which the supplemental frame is attached, said frame being provided with a sheet-metal or other form of covering 60, forming a casing for portions of the chain and coöperating elements presently to be described.

Arranged upon a shaft 60′, journaled transversely of the throat-piece 22 and outside sill 26, is a picker-wheel 62, the fingers 63 of which are curved inward and transversely of the throat 64 of the machine to engage the down corn from the rods 56 and 57 of the snout and erect it and pass it rearwardly to the fingers of a conveying-chain 65, which chain is arranged at the upper edge of the casing 60, with its fingers projecting through a suitable slot in the casing and transversely of the throat. In order to operate this chain, I mount it upon front and rear sprockets 66 and 67, respectively, which latter are carried by shafts 68 and 69, the shaft 68 being journaled at its lower end upon the step-piece 22′ and at its upper end in a suitable portion of the casing-frame. The shaft 69 is journaled upon a bracket 70, attached to a step 71, which latter is secured at one end to the throat-piece 22 and at its rear end to the front sill 20 of the platform. Arranged below the chain 60 is a second or supplementary chain 72, which latter extends from a point directly in the rear of the picker-wheel 62 rearwardly to the sprocket 73, also arranged upon the shaft 69, which latter, as also shaft 68, is inclined rearwardly at its upper end, with the result that the upper chain 65 extends slightly in the rear of the lower chain, and thus insures toppling of the cut corn onto the platform. As shown, both chains extend to a point in the rear of the cutting mechanism.

The front end of the chain 72 is carried by a sprocket-wheel 74, pivoted upon a stud 75, secured to the step 71, and in order to move the chains 65 and 72 I arrange upon the common shaft 77 of the roll 51 and gear 49 a sprocket-wheel 78, carrying a chain 79, which latter engages a sprocket-wheel 80, carried by the shaft 69, the chains thus receiving the motion from the main frame of the machine through the medium of shaft 37 and chain 35.

In order to revolve the picker-wheel 62, a sprocket-wheel 81 is arranged thereon, which sprocket-wheel carries a chain 82, extending to a second sprocket 83 upon the shaft 44, as shown in Fig. 1, the operation being evident.

The frame 59, carried by the throat-piece 23, is also provided with a casing 83', the said frame beginning at a point in the rear of the frame 58 and terminating at a point forward of the rear end of the latter frame. The rear end 84 of the frame 59 is curved to correspond to the projecting rear end 85 of the frame 58 and its casing for the purpose above described.

A second picker-wheel 86, corresponding in location and arrangement to the picker-wheel 62, is arranged upon a shaft 87, journaled upon a bracket or standard rising from the throat-piece 23, said picker-wheel being driven from the shaft 45 through the medium of sprocket-wheel 87' upon said shaft and a chain 89, arranged thereon and extending to a second sprocket 90 upon the shaft 87.

The casing 83' extends in the direction of the casing 60 to the line where it will be just cleared by the fingers of the chain 65, thus avoiding the necessity of two chains without the complications and expense incident thereto. The front ends of both casings are rounded, as shown, the front of casing 81' rising abruptly to a point near the top, where it is slanted sharply to the rear to form a hip 91, as shown.

Arranged upon the shaft 32 is a roller 93, which said roller is located adjacent the inner sill 27, a second roller 94 being journaled in suitable bearings upon the front sill 20 and also in bearings upon a transverse intermediate sill 92, the roll 94 being so positioned with respect to the end 85 of the casing 60 that a conveying-apron 94', arranged upon said rolls, will receive the cut corn from the throat of the machine and move it transversely of the platform to be received by the main frame.

Referring now to the drawings, it will be seen that all corn, whether standing or lying in any direction, will be engaged and delivered to the crushing-rolls in an erect position, from which rolls it is passed to the cutting mechanism and is finally delivered to the main-frame elevator for proper treatment and delivery.

Referring now to Fig. 6 of the drawings, in substitution of the platform just described I may employ one adapted for the cutting of wheat, which said platform is shown in Fig. 6 as consisting of a front sill 100, a rear sill 101, an outer sill 102, and an inner sill 103. The inner ends of the sills 100 and 101 are adapted for attachment to the main frame of the binder in the same manner as described in connection with the corn-cutting platform, though, as readily understood, any desired means of attachment may be employed. The usual wheat-cutting knives 104 are shown in connection with this figure, the reciprocatory knife-bar being provided with the usual heel similar to the heel 53, (shown in Fig. 1 of the drawings,) having connection with the pitman $p$, as shown in Fig. 4 of the drawings. Upon this wheat-platform are journaled the usual conveyer-rolls 105 and 106, upon which is arranged a conveying-apron, the roller 106 being rotated through the medium of a sprocket-wheel 107 upon its shaft, which sprocket-wheel is engaged by the chain $r$, as shown, and with the desired result. This platform is supported at its outer end by means of a wheel 107', the particular arrangement of which may be varied at will, and in fact the entire platform and cutting mechanism carried thereby being of the usual construction.

In order to ease the fall of the corn from the throat, I arrange a buffer 110, preferably of elastic material, such as a spring, which latter may be secured to a rear extension of the throat-piece 23 or to any other suitable portion of the platform in such position that the corn from the throat will fall upon this receptacle and be thus eased to a horizontal position and prevent the jolting or jarring of the ears from the stalk.

It will be readily understood that I may vary a large portion of the details of my machine without departing in any way from the spirit of my invention and that I may vary the proportions of the different parts, as well as the material of which they are constructed, as requirements may dictate.

In Fig. 12 I have illustrated one type of my improved corn-harvester attachment, as shown at A'', in connection with a typical binder mechanism of the open-end type, as shown at B''. It will be readily observed that the corn-cutting attachment may be removed at pleasure from the binder element and the ordinary grain-cutting platform attached, or vice versa.

Thus it will be seen that I have provided a machine of an entirely new character— namely, a machine composed of three essential features or elements—to wit, the binder element, which comprehends any suitable type of binder mechanism, a frame structure and bull-wheel, and the several adjuncts that enter into the make-up of the binder part of a harvester and binder; a corn-harvesting element or feature which comprehends a suitable platform or frame, cutting mechanism of an appropriate type for the purpose in view, and means for directing and delivering the cut corn binderward, such frame or platform being adapted to be connected with and detached from the binder element, and a grain-harvesting element or feature which comprehends a suitable platform and frame and means for conveying the cut grain binderward, having the requisite cutting mechanism, such frame or platform being likewise adapted to be connected with and be detached from the binder element alternately with the corn-harvesting element, so that in the one case the machine becomes a corn-harvester and binder and in the other a small-grain harvester and binder. This machine may be supplied to the users either in the three-fold character of an interchangeable small-grain and corn harvester and binder or in its two-fold character of a combined corn harvester and binder, with the inherent adaptability in either case to the separation of the corn-harvesting element when the occasion requires for the then attachment and substitution of the grain-harvesting element, or vice versa. It will also, of course, be understood that in either said two-part or three-part machine above indicated are included the necessary adjunctive parts to perform the incidental and subordinate functions which enter into the complete whole—as, for instance, suitable devices for delivering or directing the cut corn to the elevating or conveying mechanism of the binder, suitable devices for transmitting power to the corn-cutting mechanism, and suitable detail devices for effectuating the detachable connection between the binder element and each of the other two, respectively.

It is evident that any form of breakable means for transmitting power other than the chain and sprockets may be used, the term "breakable" including mechanism that may readily be thrown into or entirely out of connection with the mechanism of the two frames.

I would further observe that another advantage of the organization herein shown and described is that a single machine with the interchangeable elements above described may be made to do the work of two machines with a saving in the first cost and that of subsequently maintaining the machine.

Having thus described my invention, what I claim is—

1. In a harvesting-machine, the combination with the main frame and its seat-board of a pivoted U-shaped support for the board, and means for adjustably and rigidly holding each end of the support at any point in its arc of pivotal movement.

2. In a harvesting-machine, the combination with an open-ended elevator of a pivoted U-shaped support pivotally attached at its ends to the upper and lower frames of the elevator, and means for clamping said support at any point in the arc of its pivotal movement.

3. In a corn-harvester, the combination with the cutting mechanism of means comprising a plurality of elements having different speeds arranged in advance of the cutting mechanism to reduce the resistance of the material operated upon at the point of engagement of the cutting mechanism.

4. In a corn-harvester, the combination with the cutting mechanism of rolls arranged in advance thereof, and adapted to reduce the resistance of material operated upon at the point of engagement of the cutting mechanism, said rolls having different speeds of rotation.

5. In a combination grain and corn harvester, a main frame, a bull-wheel forming a support for the main frame, binding mechanism, elevating or conveying mechanism driven from the bull-wheel, forming substantially an integral part; a supplemental corn-platform having means for attachment to the main frame and bearing conveying and cutting mechanism, said supplemental platform forming substantially an integral part, and a breakable power-transmitting device between the bull-wheel and the mechanism of the supplemental frame.

6. In a combined corn and small-grain harvester, a main frame, a bull-wheel, binding mechanism, conveying mechanism driven from the bull-wheel, all forming substantially an integral part; a supplemental frame having means for attachment to the main frame and bearing cutting mechanism and means for transmitting the cut grain binderward, said supplemental frame and its superimposed parts forming substantially an integral part, and a breakable power-transmitting device between the bull-wheel and the mechanism of the supplemental frame.

7. In a combined corn and small-grain harvester, a main frame, a bull-wheel, binding mechanism, conveying mechanism forming substantially one integral part of the combination; an attachment having means for attachment to the main frame and bearing gathering mechanism, cutting mechanism and means for carrying the cut grain binderward, said attachment forming substantially an integral part of the combination, and a breakable power-transmitting device from the bull-wheel to the mechanism of the attachment.

8. In a combined corn and small-grain harvester, a main frame, a bull-wheel, binding mechanism, conveying mechanism forming substantially an integral part, a platform having means for attachment to corresponding parts of the main frame, said platform bearing gathering mechanism, cutting mechanism, platform-conveying mechanism forming substantially an integral part, and breakable means for transmitting power from the bull-wheel to the mechanism of the supplemental platform.

9. In a combined corn and wheat harvester, the combination with a main frame provided with a bull-wheel, binding mechanism and means for delivering the cut material to the binding mechanism, said mechanism and means having connection with the bull-wheel to be driven thereby, of a supplemental frame adapted for attachment to the main frame, said supplemental frame having cutting and gathering mechanism, and means for conveying the cut material to the delivery mechanism of the main frame, and breakable means for transmitting motion from the bull-wheel to the mechanism of the supplemental frame, whereby the supplemental frame may be attached to or detached from the main frame without disturbing the mechanism of either frame.

10. In a combined corn and small-grain harvester, the combination with the main frame, provided with a bull-wheel, binding mechanism and means for delivering the cut material to the binding mechanism, said means and mechanism having a connection with the bull-wheel and being driven thereby; of an attachment having means for connection and disconnection with the main frame and provided with projections extending forwardly to form a passage-way for the cornstalks, said attachment having also gathering mechanism, cutting mechanism and means for directing the cut material to the delivery mechanism of the main frame; and a breakable means for transmitting power from the bull-wheel to the mechanism of the attachment.

11. In an interchangeable three-part machine, the following instrumentalities: a binder element consisting of a frame and its essential adjunctive devices for elevating, binding and discharging the cut material, a corn-harvesting element or attachment consisting of a frame, cutting and delivering mechanism and means for connecting and disconnecting the same to and from such binder-element frame, and a grain-harvesting element or attachment consisting of a frame, cutting and delivering mechanism adapted to be connected with the binder-frame in lieu of the corn-harvesting element or attachment, and suitable power-transmitting devices for the active parts of said elements whereby an interchangeable three-part machine is provided.

12. In a harvesting-machine, the combination with the main frame having upper and lower elevator-rolls and frame-supports therefor, of a seat-board supporting the rear frame-support of the upper elevator-rolls, a pivoted U-shaped support for the seat-board, and means for clamping said support at any point in the arc of its pivotal movement.

13. In a combined corn and small-grain harvester and binder, the combination with the main frame having upper and lower elevator-rolls and frame-supports therefor, of a seat-board supporting the rear frame-support of the upper elevator-rolls, a pivoted U-shaped support for the seat-board, and means for clamping said support at any point in the arc of its pivotal movement.

In testimony whereof I affix my signature in presence of two witnesses.

WILLIAM A. GALLOWAY.

Witnesses:
   GEO. H. CHANDLER,
   A. E. MARSCHALK.